Patented Aug. 4, 1925.

1,548,358

UNITED STATES PATENT OFFICE.

ROBERT SEAVER EDWARDS, OF BROOKLINE, MASSACHUSETTS, ASSIGNOR TO RUMFORD CHEMICAL WORKS, OF PROVIDENCE, RHODE ISLAND, A CORPORATION OF RHODE ISLAND.

PLASTER OF PARIS AND METHOD OF MAKING THE SAME.

No Drawing.  Application filed May 26, 1924.  Serial No. 715,926.

*To all whom it may concern:*

Be it known that I, ROBERT S. EDWARDS, a citizen of the United States, residing at Brookline, county of Norfolk, Commonwealth of Massachusetts, have invented certain new and useful Improvements in Plaster of Paris and Methods of Making the Same, of which the following is a specification.

The general subject matter of my present invention is the production of plaster of Paris or the like, the several elements of novelty residing in method, in product, in certain (desirable characteristics of product) incident to its use, and generally in a system of controlled production with uniformity and standardization in ultimate product.

More specifically considered, my invention has particular applicability to the use of by-product calcium sulphate as a substitute for natural gypsum in the manufacture of plaster of Paris.

Plaster of Paris is produced on an extensive scale by the dehydration under suitable conditions of the natural mineral gypsum, an hydrated calcium sulphate having the formula $CaSO_4 2H_2O$.

The dehydrated gypsum when mixed with the proper amount of water becomes hydrated and crystallizes, and on this property of solidification depends the commercial use of plaster of Paris.

In addition to the natural occurrence of calcium sulphate as the mineral gypsum, it appears as a by-product in certain chemical manufacturing operations, which can be generally characterized as reactions between calcium salts and sulphuric acid. As specific examples of such processes, I mention, amongst others, the preparation of phosphoric acid from rock or bone phosphate of lime, acetic acid from acetate of lime, and boric acid from borate of lime.

These processes are all based on reactions in which sulphuric acid liberates and takes the place of the acid radicle originally combined with the calcium. The liberated acid is separated and recovered by suitable means, and the calcium sulphate either in the hydrated or semi-hydrated state remains as a residue or by-product.

To distinguish clearly the nature of the materials referred to in this application, I shall refer to the natural mineral gypsum as "gypsum", the by-product calcium sulphate as "calcium sulphate", the plaster of Paris made from natural gypsum as "plaster", and the plaster of Paris made from by-product calcium sulphate as "synthetic plaster".

Several of the processes which yield calcium sulphate as a by-product are carried out on a large scale, and the satisfactory disposal of the waste calcium sulphate has engaged the attention of the chemical industry for many years.

The use of such calcium sulphates in the manufacture of synthetic plaster was an obvious outlet for this otherwise waste product, and many efforts have been made towards the development of suitable methods and processes.

The principal use of plaster is in the building industries, and certain rigid specifications have been evolved to cover the characteristics of plaster intended for building purposes. These specifications demand a certain degree of mechanical strength in the hydrated or "set" plaster, and synthetic plaster prepared directly from by-product calcium sulphate has not hitherto uniformly met the specification requirements. As a result, synthetic plasters have not been successful and calcium sulphate has continued up to the present to be a waste product of the chemical industry.

I have conducted a long series of experiments to determine the reasons for the difference in strength between set plaster and set synthetic plaster, and have found that small amounts of acid, such as invariably accompany by-product calcium sulphate, are in large measure responsible for the decreased strength.

It has been known that several of the common mineral acids have sometimes been introduced at the time of hydration of calcined plaster to accelerate or change the set, also that certain other acids handled in the above manner may accelerate and at the same time greatly weaken the process of crystallization. One of the reactions which does not seem to have been understood was that the presence of even a small amount of these acids, prior to calcination might be fatal to any proper ultimate recrystallization of the finished product. I will in the course of my disclosure show the essential difference between the effect of acid present before calcination and acid added after calcination.

In addition to my series of experiments on means for securing a desirable degree of strength in set synthetic plaster, I have also made an experimental study of the time of setting as influenced by materials added to calcium sulphate and gypsum before and after calcination, and have made certain useful discoveries which enable me to develop not only a desirable degree of strength in my synthetic plaster, but also certain characteristics of set which are particularly valuable when my process is utilized for the manufacture of building blocks from calcium sulphate.

The time required for the hydration and crystallization of plaster or synthetic plaster is an important factor when the plasters are used for building purposes, and as I shall frequently refer to this time factor, I will hereafter use the words "setting time" to designate the period of time incident to the hydration and final crystallization of synthetic plaster and plaster.

For the purposes of my present disclosure, I will discuss my invention as applied to the conversion of calcium sulphate, obtained as a by-product (and heretofore a waste material) in the manufacture of phosphoric acid from sulphuric acid and rock or bone phosphate of lime, into a useful and marketable synthetic plaster meeting all the specifications of plaster for building purposes.

The calcium sulphate obtained as a by-product in phosphoric acid manufacture always contains varying amounts of phosphoric acid, which can only be removed by extended and thorough washings, and such extended washings, because of the solubility of calcium sulphate in water, give rise to considerable losses of calcium sulphate.

In the commercial processes of phosphoric acid manufacture, it is impracticable to completely remove phosphoric acid from calcium sulphate by washing, the usual phosphoric acid content ranging from 0.1% to 5.0%. This residual percentage is determined by the thoroughness of washing and the desired purity and strength of the phosphoric acid liquors. Excess calcium sulphate resulting from extended washings is an undesirable impurity in phosphoric acid liquors, as it causes serious difficulties in the concentration process or in uses of phosphoric acid liquors which do not call for concentration.

In actual practice I have treated one hundred and twenty-seven (127) commercial sized batches of calcium sulphate, and recovered and converted them by calcination into synthetic plaster. I have discovered that even the smaller amount $(0.1\% \ P_2O_5)$ left in the calcium sulphate greatly reduced the strength of the synthetic plaster made from said calcium sulphate, due to the interference of the contained acid with the process of hydration and crystallization. Furthermore, I have discovered that any larger amounts of phosphoric acid left in the calcium sulphate renders the synthetic plaster produced from said calcium sulphate absolutely worthless for use as a building material or commercial plaster, due to the fact that said larger amounts of phosphoric acid disturb the hydration and crystallization (and particularly its massive crystalline tendency) of the synthetic plaster to such an extent that it never develops the normal strength of plaster but remains a soft and friable mass.

I have also made comparative tests before and after calcination, and I have discovered that the presence of even a small amount of acid before calcination greatly reduces the strength of "set" synthetic plaster, whereas when introduced after calcination the same amount of phosphoric acid does not seriously affect the strength of the "set" synthetic plaster.

This difference I attribute to the inclusion of phosphoric acid within the structure of the calcium sulphate when acid is present prior to calcination, and to the interference of this included acid with the subsequent process of crystallization.

At this point it is necessary to introduce a factor of considerable importance, but difficult to explain by reason of its novelty.

I do not wish to be limited by theoretical explanation, as even the assumed fundamental theories of science have been subject to periodic changes. My explanation is therefore only a theoretical interpretation of the actual results I have secured in my experimental work.

It has been the practice in utilizing plaster to retard its setting time by introducing into the plaster mixture a foreign substance or substances. Usually these substances are of an organic nature and are colloidal in character, the so-called "stucco retarder" being an excellent example of this class. These retarders influence the final set of plaster through interference with crystallization, and while they do give a slowing up of the set, the setting time is indefinite or at least not uniform, while the resulting set plaster is weaker than would be the case with a normal set of the same plaster without a retarder. The decreased strength with these retarders is nearly proportional to the amount introduced, so the action would appear to be mechanical and confined to a slowing up in the development of crystallization.

I have discovered that while the usual retarders produce a loss of strength in the final set and are uncertain in the development of a uniform delayed setting time, it is possible through other means to defer the setting time without loss of strength in the set plaster or synthetic plaster.

This new effect, which for want of a better word, I term a "stay" is produced by means of what I term a "stabilizer." It is to be understood that these terms are adopted for the purpose of this application as available terms and not as limiting the construction and broadest interpretation of my invention.

I have stated that an acid condition is both destructive of strength of set and uniform setting time in the calcined synthetic plaster, and I have found through experiment that changing the acid content of the calcium sulphate prior to calcination to an alkaline, basic or neutral state will, under certain conditions, give a normal or improved strength of set and also a desirable and uniform stay in setting time.

The addition of sufficient alkali to neutralize the acid in calcium sulphate will not give the desired result unless precautions are taken to limit the ratio of resulting alkali salt to calcium sulphate. I have found that it is undesirable to retain more than one per cent of the salt or salts resulting from neutralization of acid, and have further discovered that control of the amount of salt left in the calcium sulphate enables me to secure a definite stay in the set of the synthetic plaster. The alkaline salt produced by neutralization is therefore, under the proper conditions, no longer a deleterious agent, but an effective stabilizer.

I have mentioned one per cent as a desirable upper limit of salt content, and I have found for such a specific purpose as the manufacture of building blocks that the presence of about 0.3 per cent of stabilizer (that is to say, the combined salt and base) gives a time factor or stay which is suitable for proper hydration and application. As building blocks can be economically produced by machinery it is very desirable to have a controllable means of staying and stabilizing the set, and this I secure by means of my stabilizer.

Calcium sulphate precipitated from solution, as in the manufacture of phosphoric acid, is in a very advantageous condition, as it has a desirable form which, if undisturbed by the presence of weakening agencies, crystallizes after calcination and hydration very rapidly and with great structural strength.

Uniformity throughout is highly desirable and any reaction product formed by neutralizing should be uniformly distributed.

In order to secure uniformity and to provide for elimination of excess base, salts, and other extraneous matter, I preferably use for neutralization a water soluble salt or the like and preferably one having a strong affinity for $P_2O_5$. Sodium hydrate or carbonate gives an immediate and complete reaction producing sodium phosphate and its distribution in solution is so complete that it has no apparent effect on ultimate strength. Furthermore, it proves to be a stabilizer in its action and upon crystallization after calcination acts to insure a simultaneous absorption of the water of crystallization throughout the mass. This is important because the less water used to gauge the plaster or synthetic plaster the stronger the material, and yet the plaster must be thoroughly hydrated before the actual crystallization of any part begins.

In accordance with my invention, therefore, I produce a synthetic plaster having a controlled basic or alkaline stabilization, and I produce such a stabilization uniformly within the plaster of Paris by taking advantage of the fact that this by-product calcium sulphate contains an acid which may be converted into a satisfactory stabilizing base. I can, therefore, use as a source of my plaster of Paris this by-product calcium sulphate and convert the very factor—viz, the acid that made it worthless—into the controlled stabilizing influence which insures the proper crystallization in the synthetic plaster so that it will have maximum ultimate strength.

As an illustrative application of the principles of my invention, I will further describe my procedure in the specific case of the manufacture of synthetic plaster from the calcium sulphate residue produced as a by-product in connection with the manufacture of phosphoric acid.

As previously explained, this calcium sulphate has phosphoric acid in it in an amount which varies from one-tenth of one per cent under the most favorable conditions of operation to as high as five per cent or even higher. This by-product residue comes from the separating process containing from 30% to 90% of entrained liquor and heretofore has been discharged onto a belt conveyor or into carts and so removed to the dump.

In practicing my invention in conjunction with such a plant, this by-product is delivered to a receiving vat or tank, where I repulp it with the addition of sufficient water to secure a consistency permitting ease of manipulation in the subsequent treatment.

From this slurry I take samples which I average and test to determine the per cent of acid present. I then add to the slurry a suitable alkaline or basic substance such as the carbonate or other suitable sodium salt so as to make available $Na_2O$ or its equivalent in sufficient amount to insure neutralization of the acid, which point again is determined by test. Such a metathetical change may be accomplished without deleterious results such as would attend the elimination or change of the acid by volatilization or other treatment which would render the resultant plaster unfit for commercial purposes. Such metathetical change may be rather complex but for present purposes may be considered generally as illustrated by the combination of the sodium of a sodium salt with the acid radical to form the sodium salt of the acid. For example, where phosphoric acid is present in the by-product calcium sulphate and sodium bicarbonate is added, we have $H_3PO_4Na$-$HCO_3$. This gives $NaH_2PO_4H_2CCO_2$ as the principal resultant. Inasmuch as a very small amount of phosphoric acid is fatal to the set and ultimate strength of the block or other article made from the synthetic plaster of Paris, I neutralize slightly in excess of the calculated exact amount. This I am able to do by using a soluble alkali compound.

Only a slight basic or alkaline condition is required to produce a stabilizing effect. In treating this phosphoric acid by-product as above explained, the acidity is usually so slight that only a small amount of neutralizing agent is required and only a small amount of base formed. I find that 0.3% to 0.4% of base or alkali produces sufficient stabilization for such uses of synthetic plaster as in forming blocks as this produces a period of stabilization of say five to six minutes. For other purposes the percentage may be increased to secure a longer stay and timing effect. The amount or the degree of the basic or akaline condition may be controlled in the step of mechanically separating the free liquor of the calcium sulphate slurry after neutralizing. If this liquor is extensively removed mechanically it carries with it a large part of the base or excess salt which is uncombined with the acid. On the other hand, if the water of the slurry be in greater part evaporated out it will leave more of the dissolved base or excess salt in the calcium sulphate. This will be readily understood by anyone skilled in the art and satisfactory control can be established at all times.

When the neutralized slurry has been thoroughly and uniformly mixed so that the acid is entirely combined and the resultant base uniformly distributed, I then removed all but about 15% to 25% of the free liquid, which is in fact a solution containing the stabilizer and any excess of the neutralizing agent which may remain uncombined. The remaining product is then carried directly to the calcining kettles. Here it is boiled or calcined in the usual manner.

The product is a plaster of Paris in a uniformly neutral, alkaline or basic state, said state having been intimately developed throughout the mass by the process of neutralizing the acid in the calcium sulphate slurry.

My invention may be variously practiced and various chemicals or reactions substituted for those suggested above. Such novel synthetic plaster may also be made from other sources than the waste calcium sulphate referred to, although obviously such by-product or waste is a most economical source wherever available.

My process is available for the recovery of any calcium sulphate that has any other acid than that discussed herein. It may also be applied to improve other processes or products.

All such uses or modifications are to be understood as comprehended in my invention if within the limits of the appended claims.

What I therefore claim and desire to secure by Letters Patent is:

1. The method of producing plaster of Paris from by-product calcium sulphate containing acid which comprises metathetically neutralizing the acid.

2. The method of producing plaster of Paris from by-product calcium sulphate containing acid which comprises metathetically neutralizing the acid and converting it into a non-deleterious compound.

3. The method of producing plaster of Paris from by-product calcium sulphate containing substances of a nature deleterious to proper crystallization, which comprises metathetically converting the deleterious substances into non-deleterious compounds.

4. The method of treating by-product calcium sulphate containing an acid which comprises neutralizing the acid with an alkali and eliminating the excess salt formed by the combination of the acid with the alkali.

5. The method of producing plaster of Paris from by-product calcium sulphate containing an acid which comprises neutralizing the acid and producing a uniform non-acid state throughout the calcium sulphate prior to calcination.

6. The method of producing plaster comprizing neutralizing by-product calcium sulphate containing an acid which comprises producing an alkaline calcium sulphate slurry and eliminating the excess alkaline liquor.

7. The method of producing plaster comprising neutralizing the acid present in by-product calcium sulphate by metathetically converting it into a water soluble salt and controlling the final composition by removal of excess liquor.

8. In a method of making plaster of Paris that step which comprises developing a non-acid state by chemical reaction in a calcium sulphate slurry.

9. In a method of making synthetic plaster of Paris that step which comprises developing a non-acid state by chemical reaction in a calcium sulphate slurry through use of water soluble neutralizing agents.

10. The method of securing a controlled period of hydration in a plaster of Paris, through the retention of a metathetically controlled amount of the salt resulting from the neutralization of acid contained in by-product calcium sulphate.

11. The method of crystallizing and obtaining a stabilized set in plaster of Paris which comprises hydrating in a metathetically controlled non-acid state.

12. As a novel article of manufacture, a plaster of Paris made from calcium sulphate containing an acid and having therein a metathetically controlled amount of the salt resulting from the neutralization of the acid.

13. As a new material for building blocks a quick setting stabilized plaster of Paris made from an acidulous by-product calcium sulphate and having therein a metathetically controlled degree of alkalinity.

14. The method of producing plaster of Paris which comprises treating the acidulous by-product calcium sulphate from the manufacture of phosphoric acid by metathetically combining the sodium of a basic sodium salt with the acid radical to form a sodium salt of the acid.

15. The method of producing plaster of Paris which comprises treating acidulous by-product calcium sulphate by a metathetical neutralization of the acid.

16. As a new material, a plaster of Paris made from an acidulous calcium sulphate having its acid metathetically neutralized.

17. As a new material, a plaster of Paris made from an acidulous calcium sulphate by metathetically neutralizing the acid, and calcining the concentrated sludge resulting therefrom.

In testimony whereof I affix my signature in presence of two witnesses.

ROBERT SEAVER EDWARDS.

Witnesses:
    VICTORIA LOWDEN,
    GEO. B. RAWLINGS.